No. 684,190. Patented Oct. 8, 1901.
W. CANTLON.
TUBE CUTTER AND EXPANDER.
(Application filed May 16, 1901.)
(No Model.)
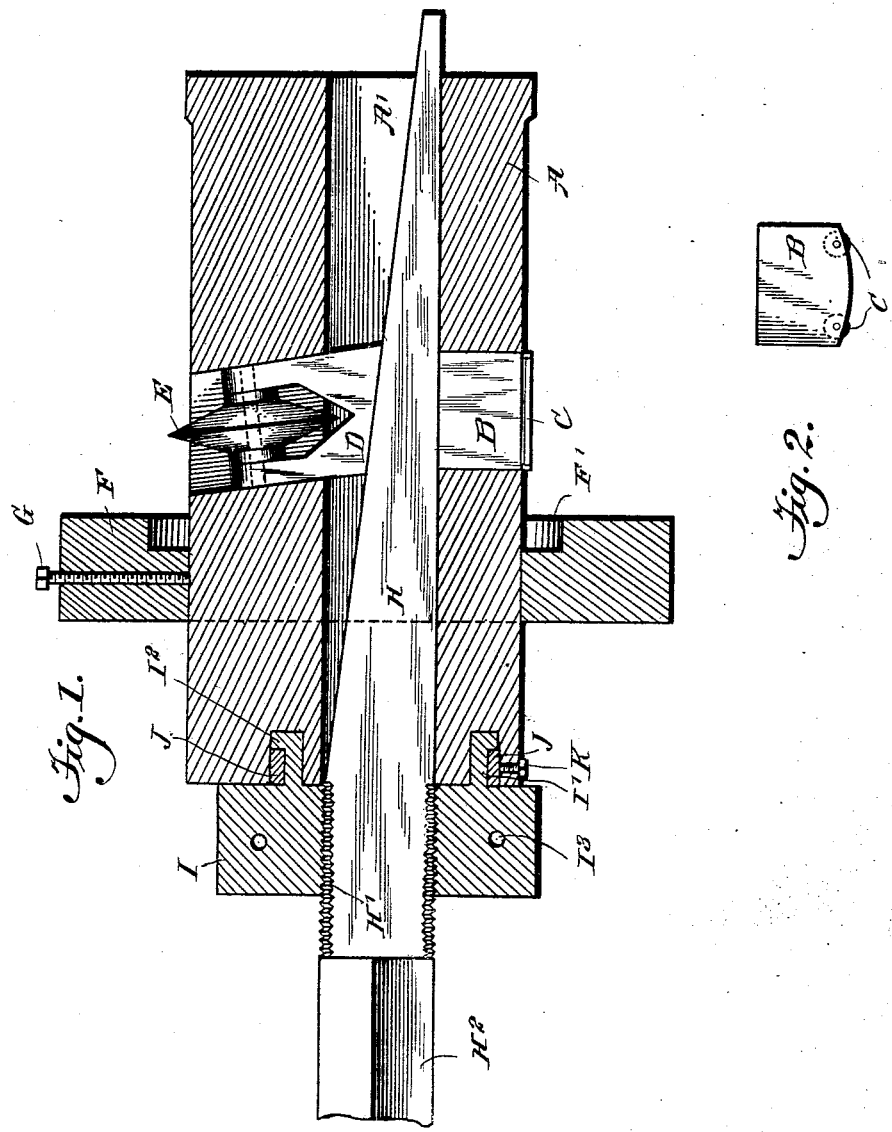
WITNESSES:
INVENTOR
William Cantlon
BY Munn & C
ATTORNEYS

UNITED STATES PATENT OFFICE.

WILLIAM CANTLON, OF PARIS, ILLINOIS.

TUBE CUTTER AND EXPANDER.

SPECIFICATION forming part of Letters Patent No. 684,190, dated October 8, 1901.

Application filed May 16, 1901. Serial No. 60,496. (No model.)

*To all whom it may concern:*

Be it known that I, WILLIAM CANTLON, a citizen of the United States, and a resident of Paris, in the county of Edgar and State of Illinois, have invented a new and Improved Tube Cutter and Expander, of which the following is a full, clear, and exact description.

My invention relates to tools for cutting or expanding tubes, and particularly boiler-tubes, and has for its object to provide a simple and reliable tool of the above-indicated class comprising but few parts, all of which are readily accessible and working without the use of springs. It has also been my aim to reduce friction as much as possible, so as to secure an easy operation.

To this end I construct my improved tool as will be fully described hereinafter and particularly pointed out in the appended claims.

Reference is to be had to the accompanying drawings, forming a part of this specification, in which similar characters of reference indicate corresponding parts in both the figures.

Figure 1 is a longitudinal section of my improved tool, and Fig. 2 is a detail end view of the roller-slide forming part of the tool.

The tool comprises a cylindrical body A, provided with an oval (or other non-circular) longitudinal central bore A', from which extends at a right angle at one side a transverse slideway in which is loosely mounted a block B, in which are journaled rollers C, of hard steel. These rollers extend lengthwise of the body and project therefrom, so as to be adapted for rolling engagement with the inner wall of the boiler-tube. At the side of the body A which is opposite to the roller-slide B is arranged another transverse slideway for the tool-carrier D. This slideway, however, instead of being arranged at a right angle to the bore A', is disposed obliquely, as shown, its inner end being nearer to the free end of the body A than its outer end. The tool-carrier D is a block forked and recessed at its outer end to receive the rotary cutter E, journaled about an axis parallel with that of the body A or slightly inclined relatively thereto, as shown. The inner end of the tool-carrier has a surface inclined with respect to the walls of the bore A'.

Upon the body A is adjustable lengthwise a collar F, adapted to abut against the head of the boiler or the end of the tube, said collar being secured in place after adjustment by means of a set-screw G or equivalent means. The collar may be recessed, as at F', to center the tool. If the tube does not fit the recess, bushings of the proper diameter may be slipped on the body A and fitted into the end of the tube. The position of the collar F relatively to the cutter E determines the distance at which the cut will be from the end of the tube.

In the oval bore A' is mounted to slide lengthwise a wedge or mandrel H of substantially oval shape at its unreduced portion—that is, at the thick end of the wedge—and adjacent to this is a cylindrically-curved threaded portion H', and the free end of the mandrel is suitably formed so that rotation may be imparted to it. For instance, such end $H^2$ may be angular (square) to fit a driving-chuck. One surface of the wedge portion of the mandrel engages the wall of the bore A' and the roller-slide B. The opposite inclined surface of the wedge engages the corresponding inner surface of tool-carrier D.

The thread of the cylindrical mandrel portion H' is engaged by a nut I, capable of turning relatively to the body A, but held against longitudinal movement. This may be accomplished, for instance, by forming the nut with a cylindrical flange I', having an outward flange $I^2$ at its free end, said flanges being within a recess in the body A, and a ring or bushing J, secured to the body A by a set-screw K, fits between the flange $I^2$ and the main portion of the nut, thus holding the latter against lengthwise movement. The nut may be turned in any suitable way, For instance, it may be provided with holes $I^3$ for the insertion of an appropriate tool.

The operation of my improved tube-cutter will be obvious. The body A is inserted into the tube to be cut with the collar F abutting against the head of the boiler or the end of the tube, and then the nut I is turned to force the tool-carrier D outward against the tube. When the cutter E has cut through or at least into the tube, the entire tool is rotated by means of a suitable mechanical device connected with the squared outer end $H^2$ of the mandrel. This causes the cutter E to revolve along the inner surface of the tube, and thus to produce a circular cut, severing the tube. The rollers C, which bear against the tube on the side opposite to the cutter, materially reduce friction, and as these rollers are mounted on the slide B, which always engages the back of the wedge H, it follows that the strain comes mainly on that part of the wedge which is between the roller-slide B and the tool-carrier D. After the tube has been cut all around the wedge H is withdrawn by turning the nut I in the opposite direction, and if the tube and tool are held upright the tool-carrier D will slide inward on the downwardly-inclined slideway which receives it. The cutter E is thus withdrawn from contact with the tube without the use of a spring, and the entire tool is then readily separable from the cut tube.

It will be observed that the tool-carrier D may easily be removed from the body A and another carrier inserted in its place. By substituting for the carrier having the rotary cutter E a similar carrier having a hardened-steel roller with a wide peripheral bearing-surface the tool can be used as a tube-expander.

Having thus described my invention, I claim as new and desire to secure by Letters Patent—

1. An implement of the character described, comprising a body having a longitudinal bore with two transverse slideways leading outwardly therefrom in opposite directions, a bearing-slide arranged to move in one of the slideways, and to engage the wall of the tube, a tool-carrier mounted to move in the other slideway, a tool on said carrier, and a wedge or expander movable lengthwise in the body's bore and extending between the said slide and the tool-carrier, in engagement with each of them.

2. An implement of the character described, comprising a body having a longitudinal bore with two transverse slideways leading outwardly therefrom in opposite directions, a bearing-slide arranged to move in one of the slideways, rollers carried by said bearing-slide and ranging lengthwise of the body, to engage the inner wall of the tube, a tool-carrier mounted to move in the other slideway, a tool on said carrier, and a wedge or expander movable lengthwise in the body's bore and extending between the said slide and the tool-carrier, in engagement with each of them.

3. An implement of the character described, comprising a body having a longitudinal bore with two transverse slideways leading outwardly therefrom in opposite directions, at about the same point, a bearing-slide arranged to move in one of the slideways, and to engage the wall of the tube, a tool-carrier mounted to move in the other slideway, a tool on said carrier, and a wedge or expander movable lengthwise in the body's bore and extending between the said slide and the tool-carrier, in engagement with each of them.

4. An implement of the character described, comprising a body having a longitudinal bore with two transverse slideways leading outwardly therefrom in opposite directions, at about the same point, one of the slideways being at a right angle to the body's bore, and the other oblique thereto, a bearing-slide arranged to move in that slideway which is at a right angle to the bore, a tool-carrier mounted to move in the oblique slideway, a tool on said carrier, and a wedge or expander movable lengthwise in the body's bore and extending between the said slide and the tool-carrier, in engagement with each of them.

In testimony whereof I have signed my name to this specification in the presence of two subscribing witnesses.

WILLIAM CANTLON.

Witnesses:
W. L. SHEPPARD,
WALTER SIMS.